United States Patent
Kwon

(10) Patent No.: US 12,341,734 B2
(45) Date of Patent: Jun. 24, 2025

(54) METHOD, COMPUTER DEVICE, AND NON-TRANSITORY COMPUTER-READABLE RECORDING MEDIUM TO DISPLAY MESSAGE INFORMATION ON MAP

(71) Applicant: LINE Plus Corporation, Seongnam-si (KR)

(72) Inventor: Soonhyun Kwon, Seongnam-si (KR)

(73) Assignee: LINE Plus Corporation, Gyeonggi-do (KR)

( * ) Notice: Subject to any disclaimer, the term of this patent is extended or adjusted under 35 U.S.C. 154(b) by 0 days.

(21) Appl. No.: 18/184,906

(22) Filed: Mar. 16, 2023

(65) Prior Publication Data

US 2023/0308406 A1 Sep. 28, 2023

(30) Foreign Application Priority Data

Mar. 28, 2022 (KR) .......... 10-2022-0037877

(51) Int. Cl.
*H04L 51/222* (2022.01)
*H04L 51/046* (2022.01)

(52) U.S. Cl.
CPC ................ *H04L 51/046* (2013.01)

(58) Field of Classification Search
CPC ..... H04L 51/046; H04L 51/222; H04L 51/04; G06F 16/444; G06F 16/487; G06F 16/909; G06Q 50/01; G06Q 50/10; G06Q 50/40; H04W 4/023; H04W 4/12; H04W 4/185; H04W 4/21
See application file for complete search history.

(56) References Cited

U.S. PATENT DOCUMENTS

| | | | |
|---|---|---|---|
| 11,146,599 B1 * | 10/2021 | Jackson | H04L 65/1101 |
| 11,146,912 B1 * | 10/2021 | Portocarrero | H04W 4/50 |
| 2003/0037110 A1 * | 2/2003 | Yamamoto | H04L 51/222 |
| | | | 709/204 |
| 2007/0036100 A1 * | 2/2007 | Shaffer | H04W 4/021 |
| | | | 370/328 |

(Continued)

FOREIGN PATENT DOCUMENTS

| | | |
|---|---|---|
| KR | 10-2002-0037074 A | 5/2002 |
| KR | 10-2015-0106180 A | 9/2015 |

(Continued)

OTHER PUBLICATIONS

Elizabeth et al., MapChat: Conversing in Place, Published Apr. 2008 https://dl.acm.org/doi/abs/10.1145/1358628.1358825 (Year: 2008).*

(Continued)

*Primary Examiner* — Dhairya A Patel
*Assistant Examiner* — Vinh Nguyen
(74) *Attorney, Agent, or Firm* — Harness, Dickey & Pierce, P.L.C.

(57) ABSTRACT

Disclosed are a method, a computer device, and a non-transitory computer-readable recording medium to display message information on a map. A message information display method includes displaying a specific area included in a map screen and associated with meta information of a chatroom on the map screen and displaying message information of the chatroom that includes the specific area as the meta information on the map screen.

17 Claims, 11 Drawing Sheets

(56) References Cited

U.S. PATENT DOCUMENTS

| | | | | |
|---|---|---|---|---|
| 2007/0225017 A1* | 9/2007 | Li | .......................... | H04W 4/20 455/446 |
| 2008/0281854 A1* | 11/2008 | Abhyanker | .......... | H04L 67/306 707/999.102 |
| 2011/0126132 A1* | 5/2011 | Anderson | ............. | G06Q 10/10 709/227 |
| 2012/0197969 A1* | 8/2012 | Poon | .................. | H04L 12/6418 709/203 |
| 2012/0254774 A1* | 10/2012 | Patton | ................. | H04L 51/222 715/758 |
| 2012/0291110 A1* | 11/2012 | Park | .................... | G06F 21/6245 709/206 |
| 2013/0091017 A1* | 4/2013 | Mullin | .................. | H04L 67/306 709/204 |
| 2013/0132489 A1* | 5/2013 | Huang | .................... | H04L 67/52 709/206 |
| 2013/0218987 A1* | 8/2013 | Chudge | ................ | H04L 51/043 709/206 |
| 2013/0226453 A1* | 8/2013 | Trussel | ................. | H04L 51/224 709/206 |
| 2014/0030980 A1* | 1/2014 | D'Ambrosio | ......... | H04W 76/40 455/41.3 |
| 2014/0168354 A1* | 6/2014 | Clavel | ..................... | H04N 7/15 348/14.09 |
| 2014/0306989 A1* | 10/2014 | Doubleday | ........ | G06Q 30/0272 345/629 |
| 2014/0357226 A1* | 12/2014 | Charugundla | ........ | H04W 12/06 455/418 |
| 2016/0080438 A1* | 3/2016 | Liang | .................. | G06F 3/04812 715/753 |
| 2016/0247213 A1* | 8/2016 | Lee | ........................ | H04L 51/04 |
| 2017/0019357 A1* | 1/2017 | Lee | ........................ | H04W 4/21 |
| 2017/0289074 A1* | 10/2017 | Joo | ........................ | H04L 67/52 |
| 2017/0290032 A1* | 10/2017 | Zhao | ....................... | H04W 4/10 |
| 2017/0303005 A1* | 10/2017 | Shen | ..................... | G06F 16/787 |
| 2018/0192260 A1* | 7/2018 | Lee | ........................ | H04W 4/12 |
| 2018/0241702 A1* | 8/2018 | Liu | ........................ | H04L 51/224 |
| 2018/0302231 A1* | 10/2018 | Sung | ....................... | H04L 51/04 |
| 2019/0272064 A1* | 9/2019 | Ghassabian | ............. | G06F 3/011 |
| 2019/0394156 A1* | 12/2019 | Ahn | ...................... | H04L 51/046 |
| 2020/0366509 A1* | 11/2020 | Jung | ..................... | H04W 4/21 |
| 2020/0382724 A1* | 12/2020 | Pena | .................. | G06F 3/04883 |
| 2021/0129018 A1* | 5/2021 | Liu | ........................ | A63F 13/216 |
| 2021/0326784 A1* | 10/2021 | Yoon | ........................ | G06F 18/29 |
| 2022/0052864 A1* | 2/2022 | Chung | .................. | H04L 12/1827 |
| 2022/0164096 A1* | 5/2022 | Maeder | ............... | G06F 3/04842 |
| 2023/0043578 A1* | 2/2023 | Lee | .................... | G01C 21/3623 |

FOREIGN PATENT DOCUMENTS

| | | |
|---|---|---|
| KR | 10-1874049 B1 | 7/2018 |
| KR | 10-2020-0131478 A | 11/2020 |

OTHER PUBLICATIONS

Korean Office Action dated Mar. 7, 2024 issued in Korean Patent Application No. 10-2022-0037877 with English translation.

Churchill, et al. "MapChat: Conversing in Place," CHI 2008Proceedings—Works in Progress, pp. 3165-3170 (2008).

* cited by examiner

METHOD, COMPUTER DEVICE, AND NON-TRANSITORY COMPUTER-READABLE RECORDING MEDIUM TO DISPLAY MESSAGE INFORMATION ON MAP

CROSS-REFERENCE TO RELATED APPLICATION(S)

This U.S. non-provisional application and claims the benefit of priority under 35 U.S.C. § 119 to Korean Patent Application No. 10-2022-0037877, filed on Mar. 28, 2022, the entire contents of which are incorporated herein by reference in their entirety.

BACKGROUND

Technical Field

Some example embodiments relate to technology for providing a real-time conversation service, in particular, to technology for displaying message information for each chat room on a map screen.

Related Art

An instant messenger that is a general communication tool refers to software that allows a user to send and receive a message or data in real time. The user may register a contact on a messenger and may send and receive messages with a counterpart on a contact list in real time.

Due to such a messenger function, the messenger is commonly used in a mobile environment of a mobile communication terminal as well as a personal computer (PC).

As the use of an instant messenger becomes more popular and functions provided through the instant messenger become more diversified, an OpenChat function that enables a chat with a counterpart using a link without sharing personal information, such as a telephone number and an ID, is being serviced.

SUMMARY

Some example embodiments may display, on a map, a chatroom related to an area within the map and may also display message information of each chatroom.

Some example embodiments may display, on a map, at least some of messages sent within a predetermined (or, alternatively, desired) time range in a chatroom.

According to an aspect of at least one example embodiment, there is provided a message information display method executed by a computer device including at least one processor configured to execute computer-readable instructions included in a memory. The message information display method may include displaying, by the at least one processor, a specific area included in a map screen and associated with meta information of a chatroom, on the map screen, and displaying, by the at least one processor, message information of the chatroom that includes the specific area as the meta information, on the map screen.

The displaying of the specific area may include displaying the specific area associated with the meta information of the chatroom among areas included in the map screen, through a separate area identification interface.

The displaying of the specific area may include displaying at least one of a number of chatrooms in which the specific area is associated with the meta information and a number of members of an entirety of the chatrooms with the area identification interface.

The displaying of the specific area may include differently displaying a display element of the area identification interface based on at least one of a number of chatrooms in which the specific area is associated with the meta information and a number of members of an entirety of the chatrooms.

The displaying of the specific area may include, in response to a selection on at least one specific area, displaying a list of chatrooms in which the selected specific area is associated with the meta information.

The displaying of the message information of the chatroom may include displaying information on a recent message sent in the chatroom within a desired time range, on the map screen.

The displaying of the specific area may include displaying the specific area associated with the meta information of the chatroom among areas included in the map screen through a separate area identification interface, and the displaying of the message information of the chatroom may include displaying a message interface that includes information on a recent message sent in the chatroom within a desired time range, at a location adjacent to the area identification interface.

The displaying of the message information of the chatroom may include displaying an interface representing presence of the recent message or an interface including at least a portion of a body of the recent message or a keyword extracted from the body through the message interface.

The displaying of the message information of the chatroom may include displaying an interface representing a sender profile of the recent message through the message interface.

The displaying of the message information of the chatroom may include displaying information on a message sent from a chatroom selected based on chatroom rankings through the message interface when a plurality of chatrooms is associated with a same metadata.

The displaying of the message information of the chatroom may include differently displaying a display element of the message interface based on a number of recent messages.

According to an aspect of at least one example embodiment, there is provided a non-transitory computer-readable recording medium storing instructions that, when executed by a processor, cause a computer device to implement the aforementioned message information display method.

According to an aspect of at least one example embodiment, there is provided a computer device including a memory configured to store computer-readable instructions and at least one processor configured to execute computer-readable instructions included in the memory, the at least one processor configured to cause the computer device to display a specific area included in a map screen and associated with meta information of a chatroom on the map screen, and display message information of the chatroom that includes the specific area as the meta information on the map screen.

Further areas of applicability will become apparent from the description provided herein. The description and specific examples in this summary are intended for purposes of illustration only and are not intended to limit the scope of the present disclosure.

DETAILED DESCRIPTION

Figure 1:
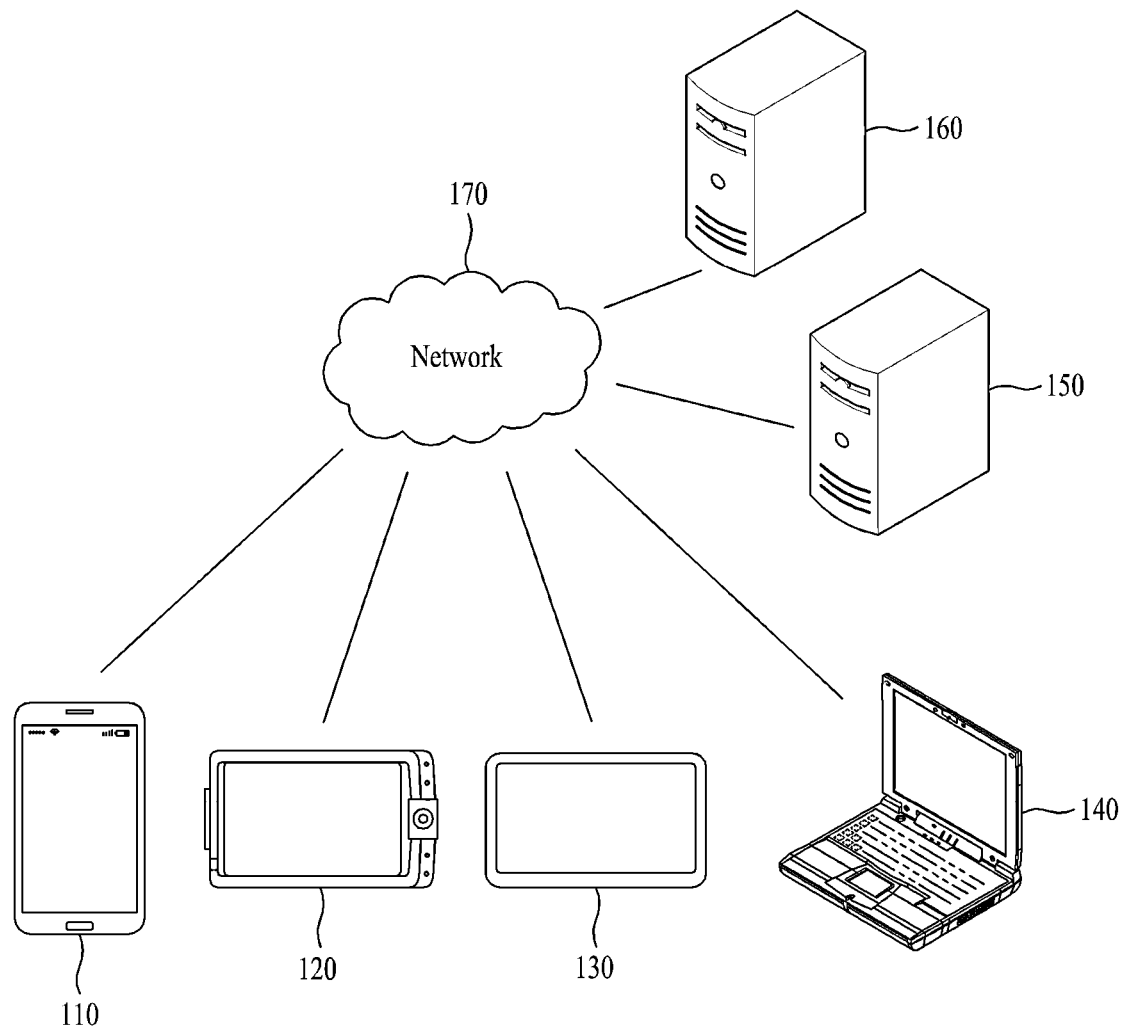
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device, however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described with reference to the accompanying drawings.

Some example embodiments relate to technology for providing a real-time conversation service.

Some example embodiments herein may display chatrooms related to an area in a map and message information of each chatroom using the map.

A message information display system according to some example embodiments may be implemented by at least one computer device. A message information display method according to some example embodiments may be performed by at least one computer device included in the message information display system. Here, a computer program according to an example embodiment may be installed and run on the computer device and the computer device may perform an message information display method according to an example embodiment under control of the computer program. The aforementioned computer program may be stored in a computer-readable recording medium to implement the message information display method in conjunction with the computer device.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as one example of environments applicable to the example embodiments and an environment applicable to the example embodiments is not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer devices capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a service, for example, a messenger service, to the plurality of electronic devices 110, 120, 130, and 140 connected over the network 170.

Figure 2:
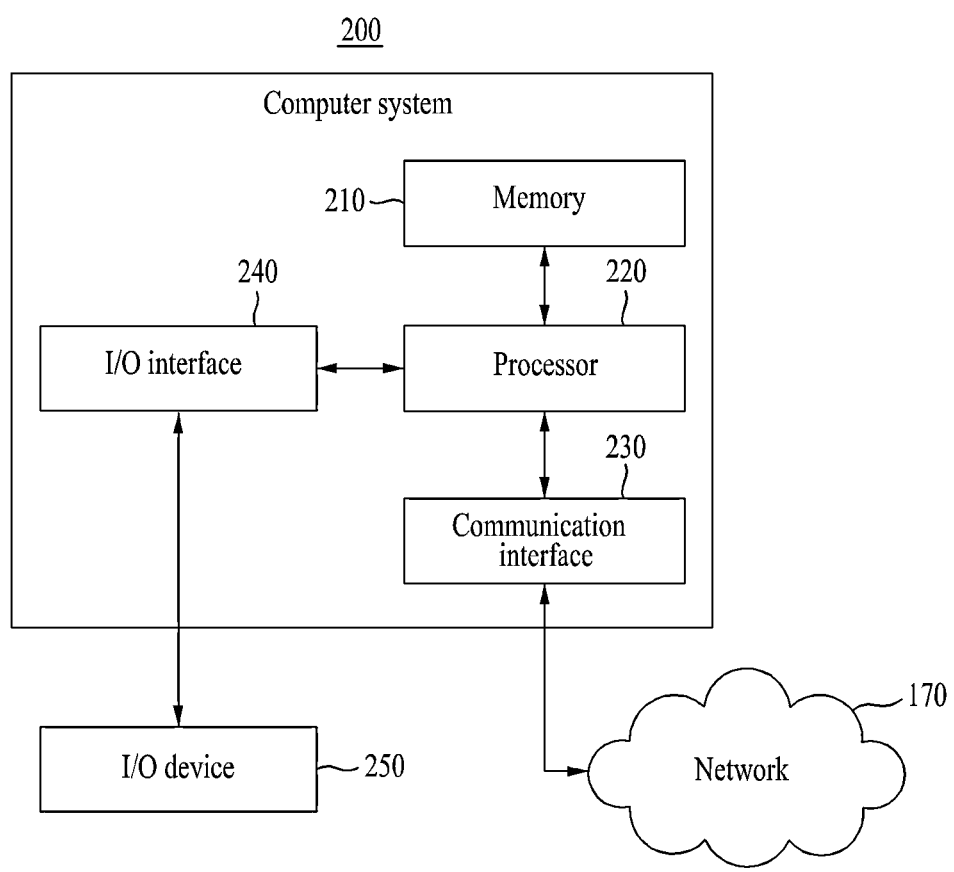
FIG. 2 is a diagram illustrating an example of a computer device according to at least one example embodiment.

FIG. 2 is a block diagram illustrating an example of a computer device according to at least one example embodiment. Each of the plurality of electronic devices 110, 120, 130, and 140 or each of the servers 150 and 160 may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable recording medium. The permanent mass storage device, such as ROM and a disk drive, may be included in the computer device 200 as a permanent storage device separate from the memory 210. Also, an OS and at least one program code may be stored in the memory 210. Such software components may be loaded to the memory 210 from another non-transitory computer-readable recording medium separate from the memory 210. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 210 through the communication interface 230, instead of the non-transitory computer-readable recording medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The computer-readable instructions may be provided by the memory 210 or the communication interface 230 to the processor 220. For example, the processor 220 may be configured to execute received instructions in response to a program code stored in a storage device, such as the memory 210.

The communication interface 230 may provide a function for communication between the communication device 200 and another apparatus, for example, the aforementioned storage devices. For example, the processor 220 of the computer device 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer device 200 through the communication interface 230 of the computer device 200. For example, a signal, an instruction, data, etc., received through the communication interface 230 may be forwarded to the processor 220 or the memory 210, and a file, etc., may be stored in a storage medium, for example, the permanent storage device, further includable in the computer device 200.

The I/O interface 240 may be a device used for interfacing with an I/O device 250. For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. The I/O device 250 may be configured as a single apparatus with the computer device 200.

Also, according to other example embodiments, the computer device 200 may include a greater or smaller number of components than the number of components of FIG. 2. However, there is no need to clearly illustrate most conventional components. For example, the computer device 200 may be configured to include at least a portion of the I/O device 250 or may further include other components, such as a transceiver and a database.

Hereinafter, methods and/or apparatuses for displaying message information on a map according to some example embodiments will be described.

The term "chatroom" herein may inclusively represent a communication space on the Internet, such as a messenger and a social network service (SNS). The term "chatroom" may represent a community space that allows participation in a conversation on the premise of joining. For example, the chatroom may correspond to an OpenChat that allows communication with a stranger through a link (e.g., uniform resource locator (URL)) without a friend addition process using a telephone number or an ID, and a chatroom with an official account representing an account in a form of a bot that provides various services or contents.

Herein, an OpenChat chatroom that is one type of a chatroom is described as a detailed example embodiment.

The computer device 200 according to the example embodiment may provide a client with a messenger service through connection to an exclusive application installed on the client or a website/mobile site related to the computer device 200. A message information display system implemented as a computer may be configured in the computer device 200. For example, the message information display system may be implemented in a form of a program that independently operates or may be configured in an in-app form of a specific application to be operable on the specific application.

The processor 220 of the computer device 200 may be implemented as a component for performing the following message information display method. Depending on example embodiments, components of the processor 220 may be selectively included in or excluded from the processor 220. Also, depending on example embodiments, the components of the processor 220 may be separated or merged for functional representation of the processor 220.

The processor 220 and the components of the processor 220 may control the computer device 200 to perform operations included in the following message information display method. For example, the processor 220 and the components of the processor 220 may be configured to execute an instruction according to a code of at least one program and a code of an OS included in the memory 210.

Here, the components of the processor 220 may be representations of different functions performed by the processor 220 in response to an instruction provided from a program code stored in the computer device 200.

The processor 220 may read an instruction from the memory 210 to which instructions related to control of the computer device 200 are loaded. In this case, the read instruction may include an instruction for controlling the processor 220 to perform the following operations.

The following operations included in the message information display method may be performed in order different from illustrated order. A portion of the operations may be omitted or an additional process may be further included.

Operations included in the message information display method may be performed by, for example, a client on which a messenger is installed and may also be performed by the server 150 depending on example embodiments.

Figure 3:
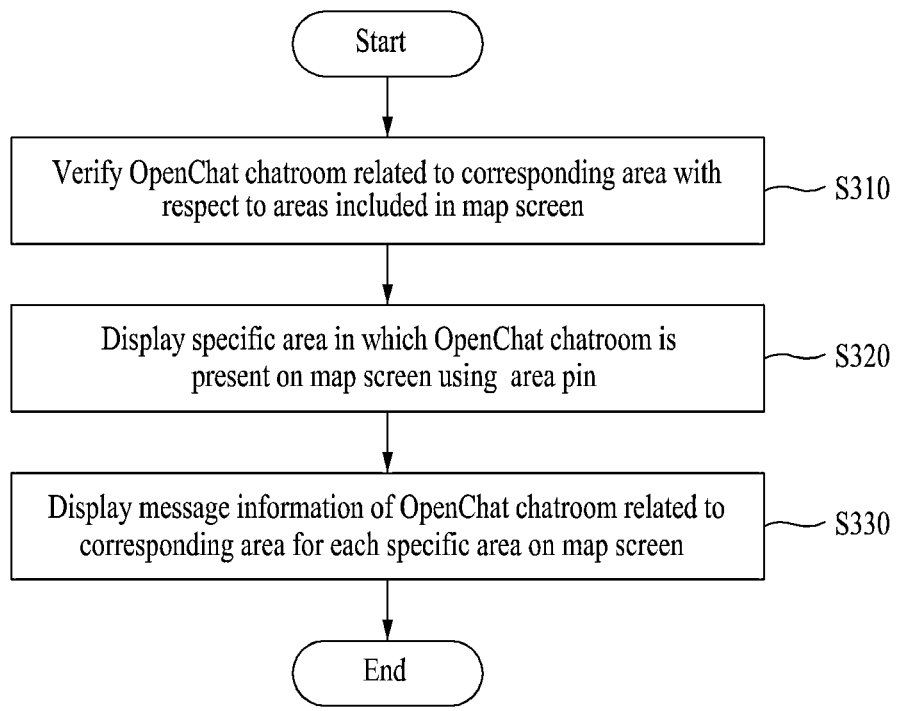
FIG. 3 is a flowchart illustrating an example of a method performed by a computer device according to at least one example embodiment.

FIG. 3 is a flowchart illustrating an example of a method performed by a computer device according to at least one example embodiment.

Referring to FIG. 3, in operation S310, when a user accesses a page that includes a map screen in an environment linked with a map service, the processor 220 may verify an OpenChat chatroom related to each area with respect to areas included in the corresponding map screen. A portion of OpenChat chatrooms may be associated with a specific area as meta information of a chatroom. For example, a portion of OpenChat chatrooms may be generated as area-oriented chatrooms each using a specific area as a subject. This OpenChat chatroom may include an area tag representing an area set as a chatroom subject. The area tag may be included as metadata of the corresponding OpenChat chatroom and may be used to classify or search for the OpenChat chatroom by area. When the user accesses the page that includes the map screen, the processor 220 may verify an OpenChat chatroom in which an area within a corresponding map is specified as a subject through an application programming interface (API). That is, the processor 220 may search for an OpenChat chatroom in which a corresponding area is set as a subject with respect to each of areas included in the map through a chatroom search using an area tag.

In operation S320, the processor 220 may display a specific area in which an OpenChat chatroom is present among areas within the corresponding map on the map screen of the page accessed by the user through a separate user interface (e.g., an icon, hereinafter, referred to as an area pin) for identifying the corresponding area. The processor 220 may assist the user in recognizing an area in which an OpenChat chatroom is present by displaying an area in which at least one OpenChat chatroom is generated, that is, an area associated with meta information of an OpenChat chatroom among areas included in the map screen through an area pin. Here, the processor 220 may display information on a OpenChat chatroom of a corresponding area on the area pin or a location adjacent to the area pin for each area in which an OpenChat chatroom is present. For example, the processor 220 may display the number of OpenChat chatrooms present in an area or a total number of members of an entirety of the OpenChat chatrooms with area pins. Also, the processor 220 may distinguishably display a display element (e.g., a size or a color) of an area pin based on size information of an OpenChat chatroom for each area. For example, the processor 220 may display a size of an area pin of a corresponding area to be larger than other areas according to an increase in the number of OpenChat chatrooms of the area or an increase in a total number of members of all OpenChat chatrooms. When the user selects a specific area pin on the map screen, the processor 220 may provide a list of OpenChat chatrooms of the corresponding area. The processor 220 may display a list of OpenChat chatrooms according to a chatroom ranking logic. For example, the processor 220 may determine rankings of OpenChat chatrooms based on the number of members, the number of messages, message quality score, etc. of a corresponding chatroom and may sort the OpenChat chatrooms. Here, in displaying a list of OpenChat chatrooms on the map screen, the processor 220 may display a list of OpenChat chatrooms through various types of interfaces (e.g., a slide popup screen appearing on one side of the map screen or a floating screen appearing on a circular line around an area pin based on the area pin).

In operation S330, the processor 220 may display, on the map screen, message information of an OpenChat chatroom related to a corresponding area for each area in which the OpenChat chatroom is present. That is, the processor 220 may display message information of an OpenChat chatroom that includes a corresponding area as meta information for each of areas associated with OpenChat chatrooms among areas included in the map screen. For example, when a message sending history is present within a predetermined (or, alternatively, desired) time range (e.g., the last 1 hour) in an OpenChat chatroom, the processor 220 may display related message information at a location adjacent to an area pin of an area to which the corresponding OpenChat chatroom belongs. When a recent message sent within a predetermined (or, alternatively desired) time range is present in an OpenChat chatroom of a corresponding area with respect to areas in which OpenChat chatrooms are present, the processor 220 may display a message icon representing presence of the recent message, a profile icon representing a sender profile of the recent message, and/or a message speech balloon including at least a portion of the body of the recent message or a keyword extracted from the body through an interface (hereinafter, referred to as a message information interface) that includes corresponding message information. That is, the processor 220 may display a portion of messages sent in real time in the OpenChat chatroom on the map. Here, when there is a plurality of recent messages sent within a predetermined (or, alternatively, desired) time range, the processor 220 may select a portion of the recent messages based on ranking of the OpenChat chatroom and may display corresponding message information. If a plurality of OpenChat chatrooms is associated with the same metadata, that is, the same area, the processor 220 may select a recent message of an OpenChat chatroom with relatively high ranking and may provide the selected recent message as message information. If a plurality of recent messages is present in the same OpenChat chatroom, the processor 220 may select a most recently sent message or a message that includes a main keyword related to a subject or an area and may provide the selected message as message information. Here, in displaying message information with an area pin on the map screen, the processor 220 may distinguishably display a display element (e.g., a size or a color) of a message information interface based on the number of recent messages sent within a predetermined (or, alternatively, desired) time range. For example, according to an increase in the number of recent messages in an OpenChat chatroom of an area, the processor 220 may display a message information interface of the corresponding area to be larger than other areas.

FIGS. 4 to 7 illustrate examples of a service screen for displaying an area with an OpenChat chatroom on a map according to at least one example embodiment.

FIGS. 4 to 7 illustrate an OpenChat interface screen 400 using a map as a service screen displayed on a client device that is an electronic device of a user.

Figure 4:
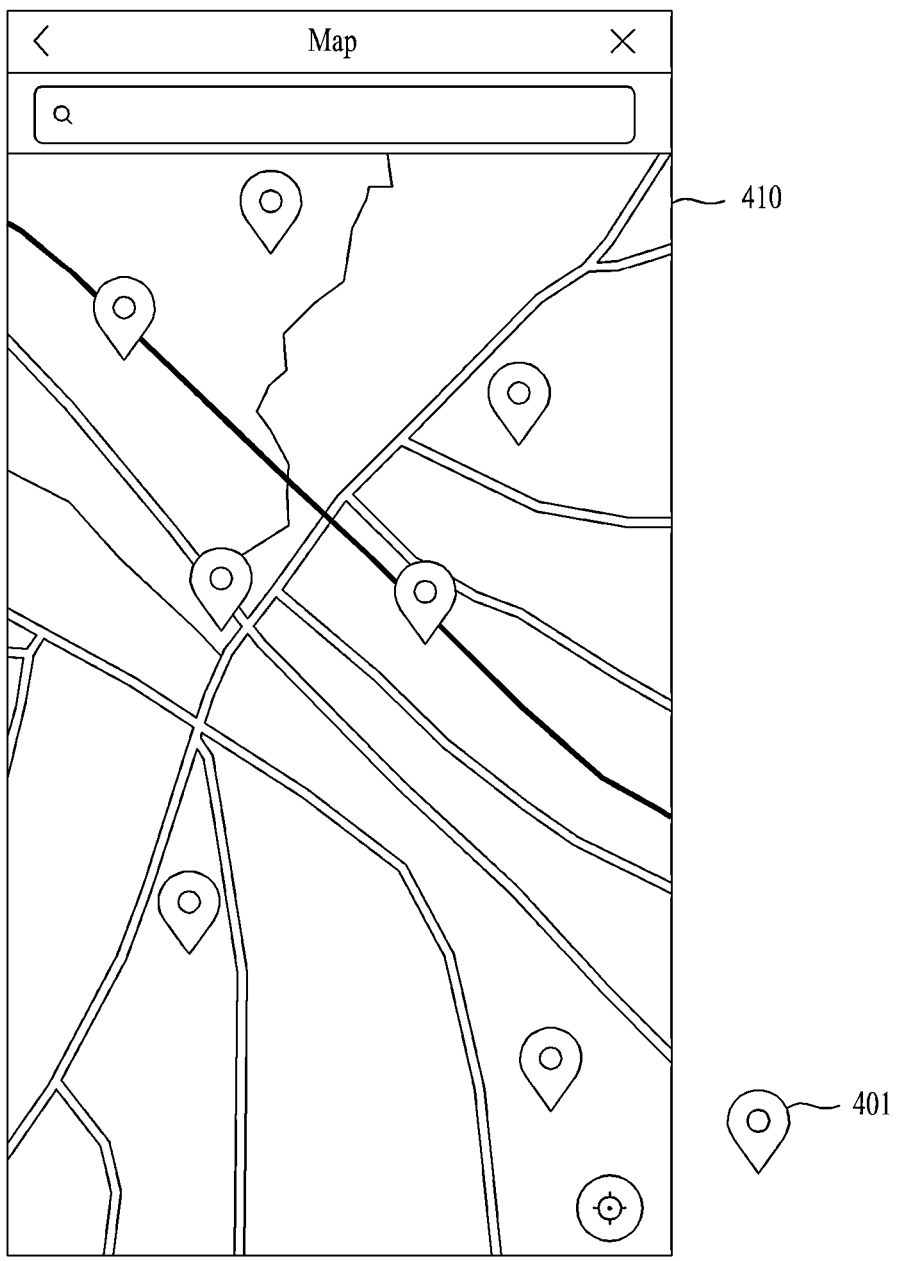
FIGS. 4 to 7 illustrate examples of a service screen for displaying an area with an OpenChat chatroom on a map according to at least one example embodiment.

Referring to FIG. 4, the OpenChat interface screen 400 corresponds to a messenger service screen that interacts with a map service and may be configured as a map screen 410.

The processor 220 may mark an area in which at least one OpenChat chatroom is present among areas included in the corresponding map on the map screen 410 of the OpenChat interface screen 400 using an area pin 401.

The processor 220 may display information on the OpenChat chatroom of the corresponding area on the area pin 401 or at a location adjacent to the area pin 401.

Figure 5:
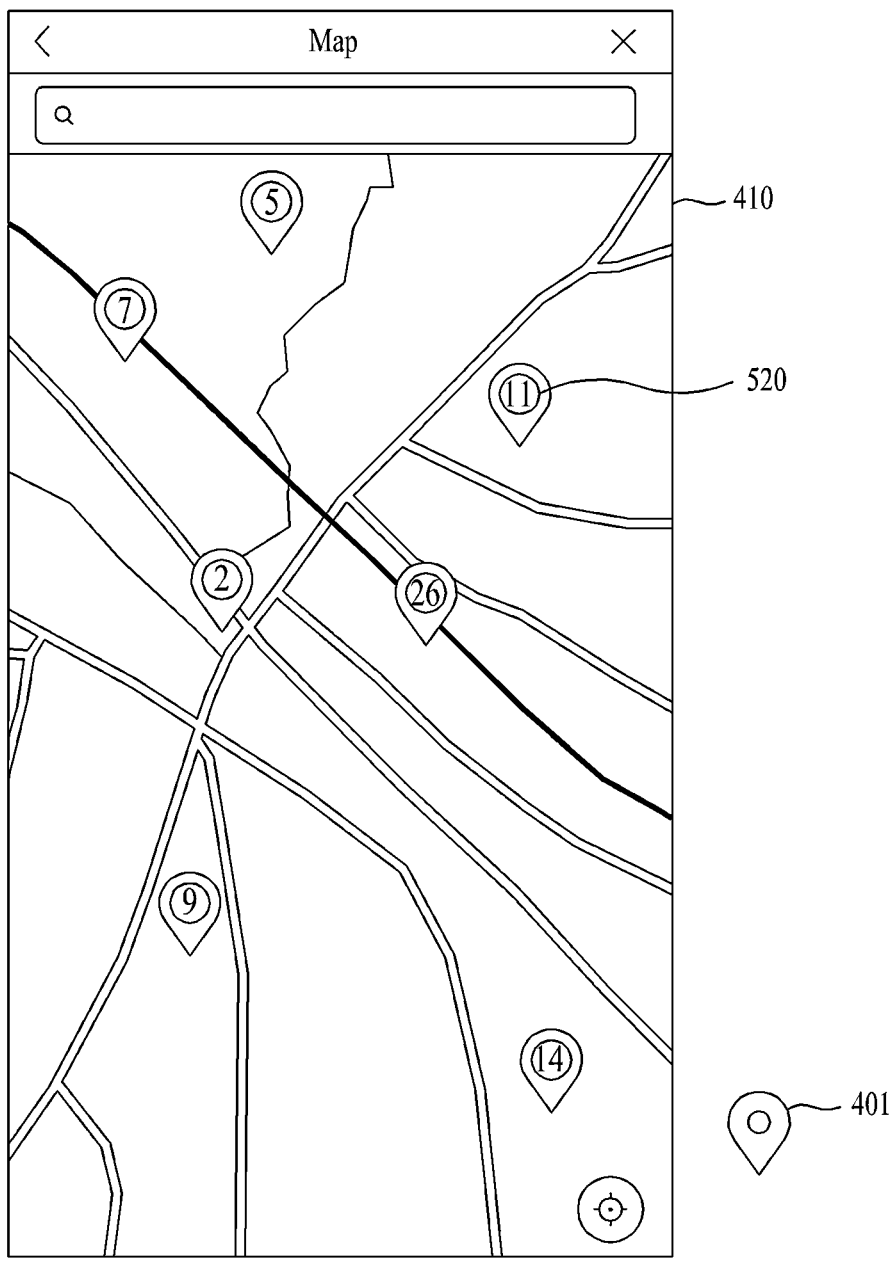

For example, referring to FIG. 5, the processor 220 may display the number of OpenChat chatrooms 520 present in a corresponding area on the area pin 401. The processor 220 may display a total number of members of an entirety of OpenChat chatrooms present in the corresponding area as OpenChat chatroom information by area, instead of displaying the number of OpenChat chatrooms 520.

In addition to a method of directly displaying the number of OpenChat chatrooms 520 or a total number of members of an entirety of OpenChat chatrooms on the area pin 401, a display element (e.g., a size, a color, etc.) of the area pin 401 may be distinguishably displayed according to the number of OpenChat chatrooms 520 or the total number of members of an entirety of OpenChat chatrooms.

The processor 220 may provide a zoom-in (magnification) function and a zoom-out (minification) function for the map screen 410 and the range of OpenChat chatroom coverage may vary according to the zoom-in function and the zoom-out function. For example, in the case of zooming in on the map screen 410, a narrower area may be displayed and the number of area pins 401, an amount or a type of information included in the area pin 401, or an amount or a type of information displayed around the area pin 401 may vary according to the zoom-in.

Figure 6:
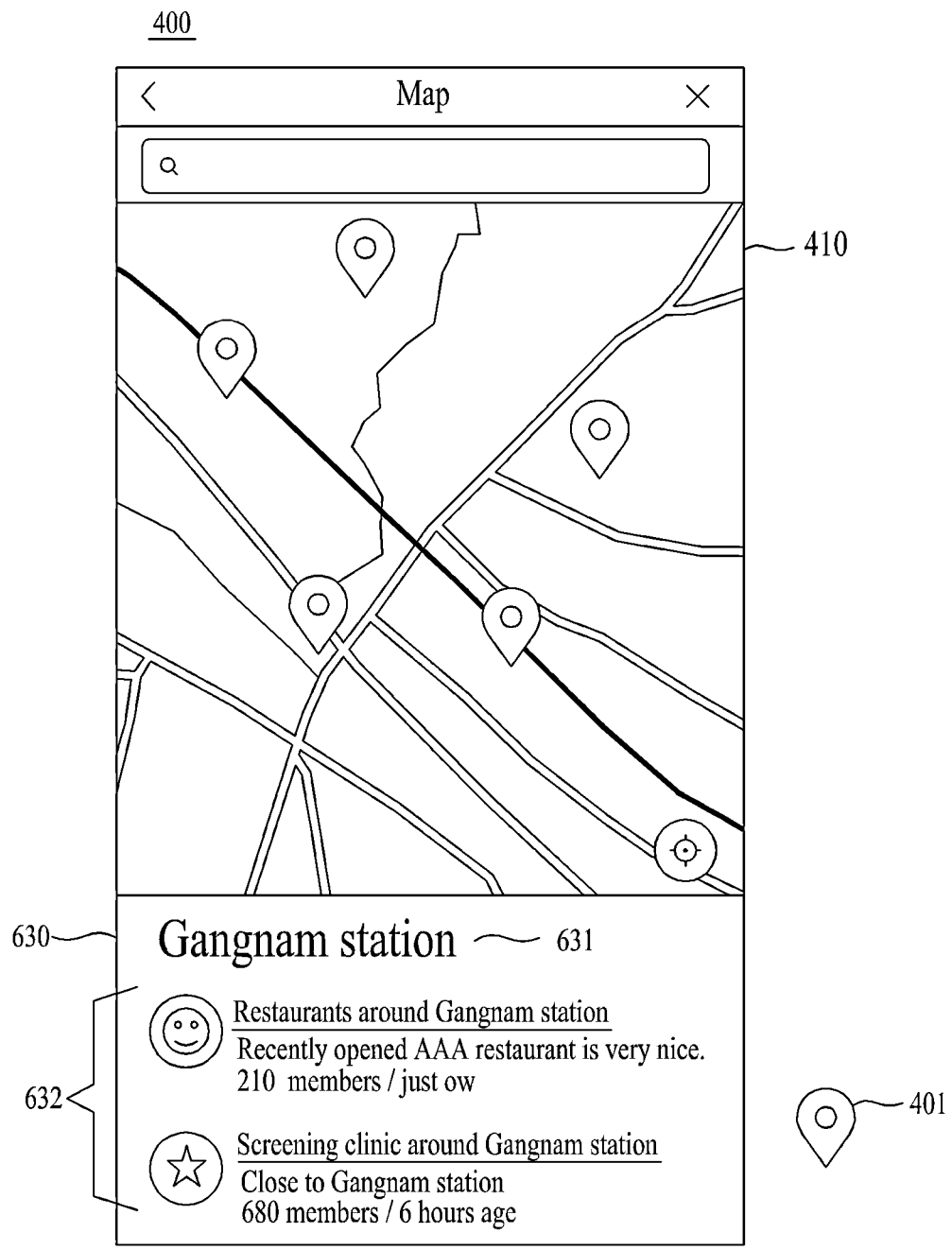

Referring to FIG. 6, in response to a selection of a user on the area pin 401 of the specific area, the processor 220 may provide an area name 631 and a list of OpenChat chatrooms 632, in which a corresponding area is set as a subject, through a slide popup screen 630 appearing on one side of the map screen 410.

The processor 220 may highlight and thereby display the area pin 401 selected by the user from among the area pins 401 on the map screen 410.

The processor 220 may configure the list of OpenChat chatrooms 632 with at least a portion of OpenChat chatrooms having a corresponding area tag.

The processor 220 may determine chatroom rankings based on the number of members, the number of messages, a message quality score, and/or the like of each OpenChat chatroom and then may configure and display the list of OpenChat chatrooms 632 using the chatroom rankings.

With respect to each chatroom included in the list of OpenChat chatrooms 632, at least one of a name of a corresponding chatroom, a profile image, the number of members that joins the chatroom, at least a portion of the body of a recent message, and a time at which the recent message is sent may be displayed.

The processor 220 may provide the list of OpenChat chatrooms 632 through various types of interfaces other than the slide popup screen 630.

Figure 7:
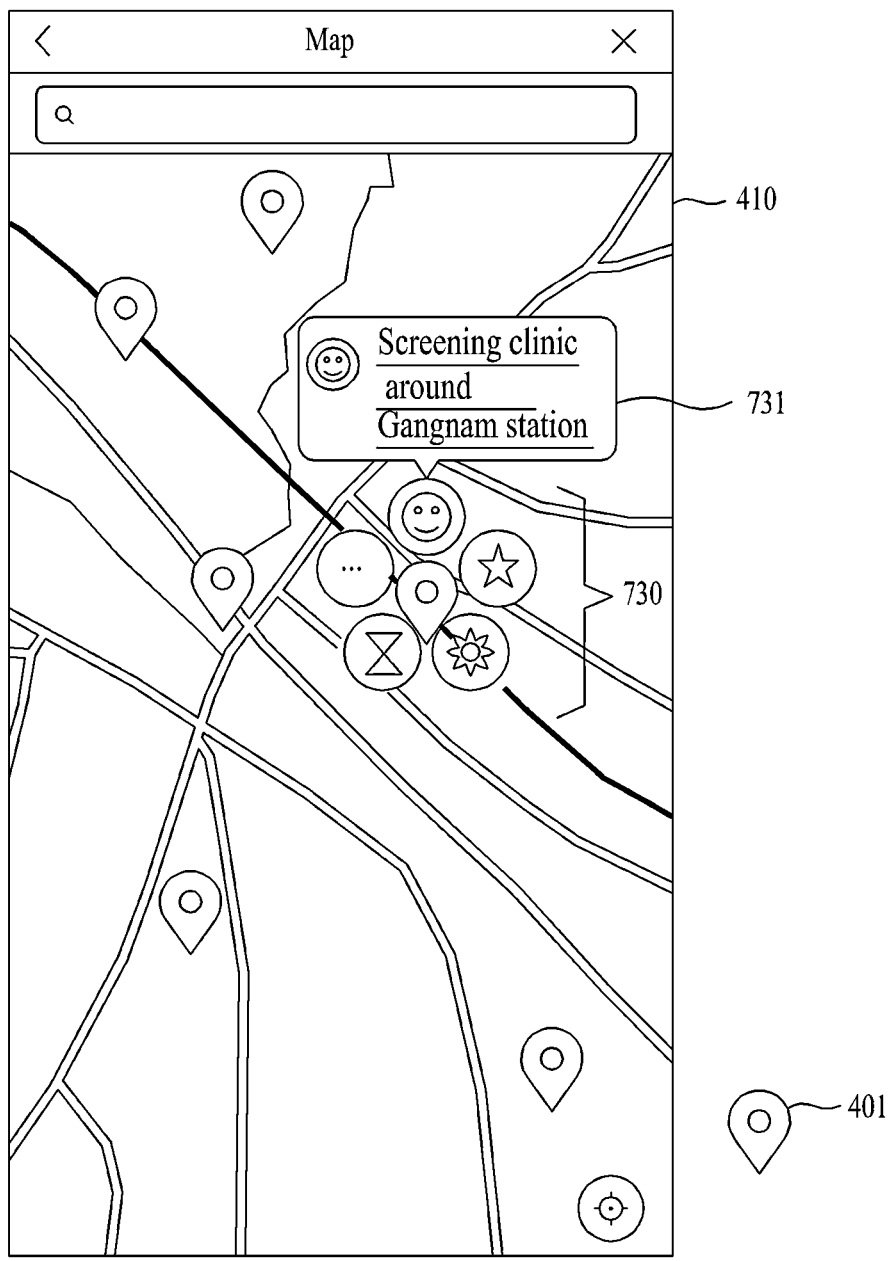

For example, referring to FIG. 7, the processor 220 may display a list of OpenChat chatrooms 730 in a form of a floating menu appearing on a circular line around the area pin 401 based on the area pin 401 selected by the user.

In response to a selection on a specific chatroom from the list of OpenChat chatrooms 730, at least one of a name of the corresponding chatroom, a profile image, the number of members that join the chatroom, at least a portion of the body of a recent message, and/or a time at which the recent message is sent may be displayed as information 731 on the selected specific chatroom.

FIGS. 8 to 11 illustrate examples of a service screen for displaying message information of an OpenChat chatroom on a map according to at least one example embodiment.

FIGS. 8 to 11 illustrate a service screen displayed on a client device that is an electronic device of a user.

In displaying an area in which an OpenChat chatroom is present on the map screen 410 using the area pin 401, the processor 220 may display message information of the corresponding area with the area pin 401.

When a message sending history is present within a predetermined (or, alternatively, desired) time range (e.g., last 1 hour) in an OpenChat chatroom associated with a corresponding area for each area in which an OpenChat chatroom is present, the processor 220 may display related message information at a location adjacent to the corresponding area pin 401.

Figure 8:
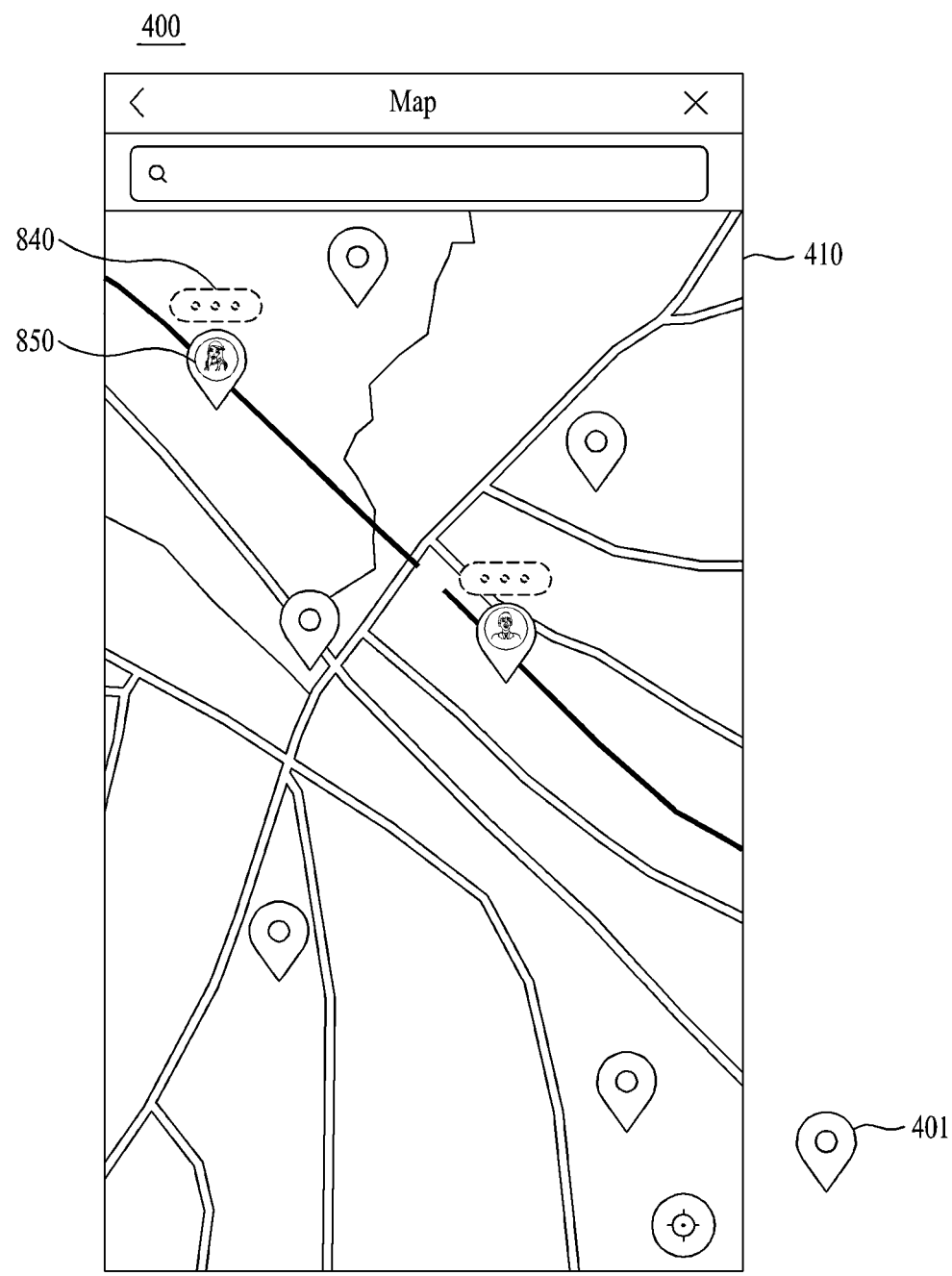
FIGS. 8 to 11 illustrate examples of a service screen for displaying message information of an OpenChat chatroom on a map according to at least one example embodiment.

For example, referring to FIG. 8, the processor 220 may display a message icon 840 representing presence of a recent message sent within a predetermined (or, alternatively, desired) time range at an upper end of the area pin 401 and may also display a profile icon 850 representing a sender profile of a recent message on the area pin 401.

Depending on example embodiments, display information related to the area pin 401 may vary according to zooming in and zooming out on the map screen 410. For example, if a map scale reaches a desired threshold according to zooming in on the map screen 410 while displaying OpenChat chatrooms 520 present in the corresponding area on the area pin 401 as shown in FIG. 5, the message icon 840 and the profile icon 850 may be displayed on or adjacent to the area pin 401 as shown in FIG. 8.

Figure 9:
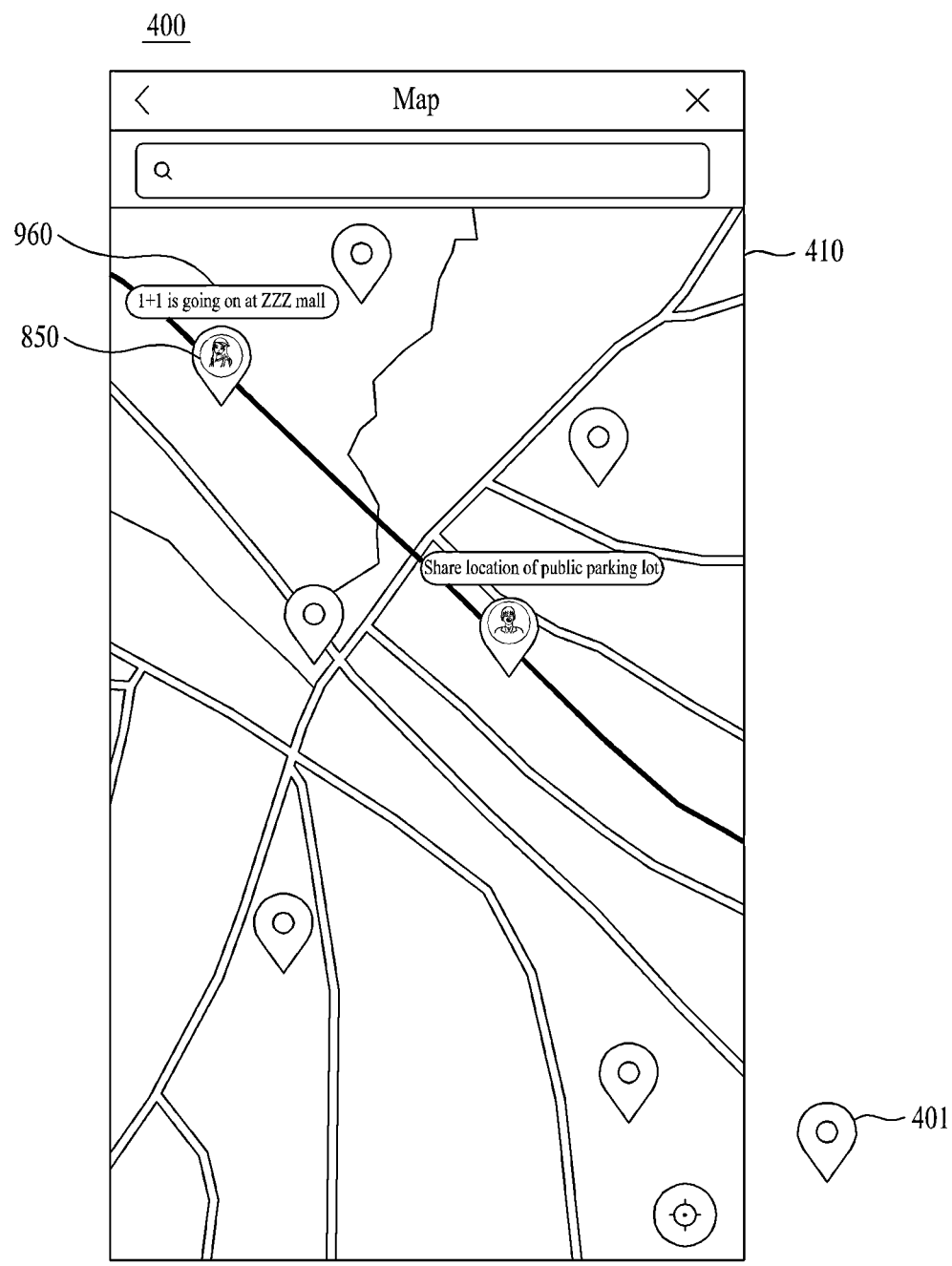

As another example, referring to FIG. 9, the processor 220 may display a message speech balloon 960 including at least a portion of the body of a recent message sent within a predetermined (or alternatively, desired) time range or a keyword extracted from the body at an upper end of the area pin 401.

The message speech balloon 960 may include a message body corresponding to a preset (or alternatively, desired) number of characters and may include a meaningful keyword extracted from a message depending on some example embodiments.

A recent message of a top ranking OpenChat chatroom according to chatroom rankings among OpenChat chatrooms that belong to the same area may be used for a message that configures the message speech balloon 960.

Figure 10:
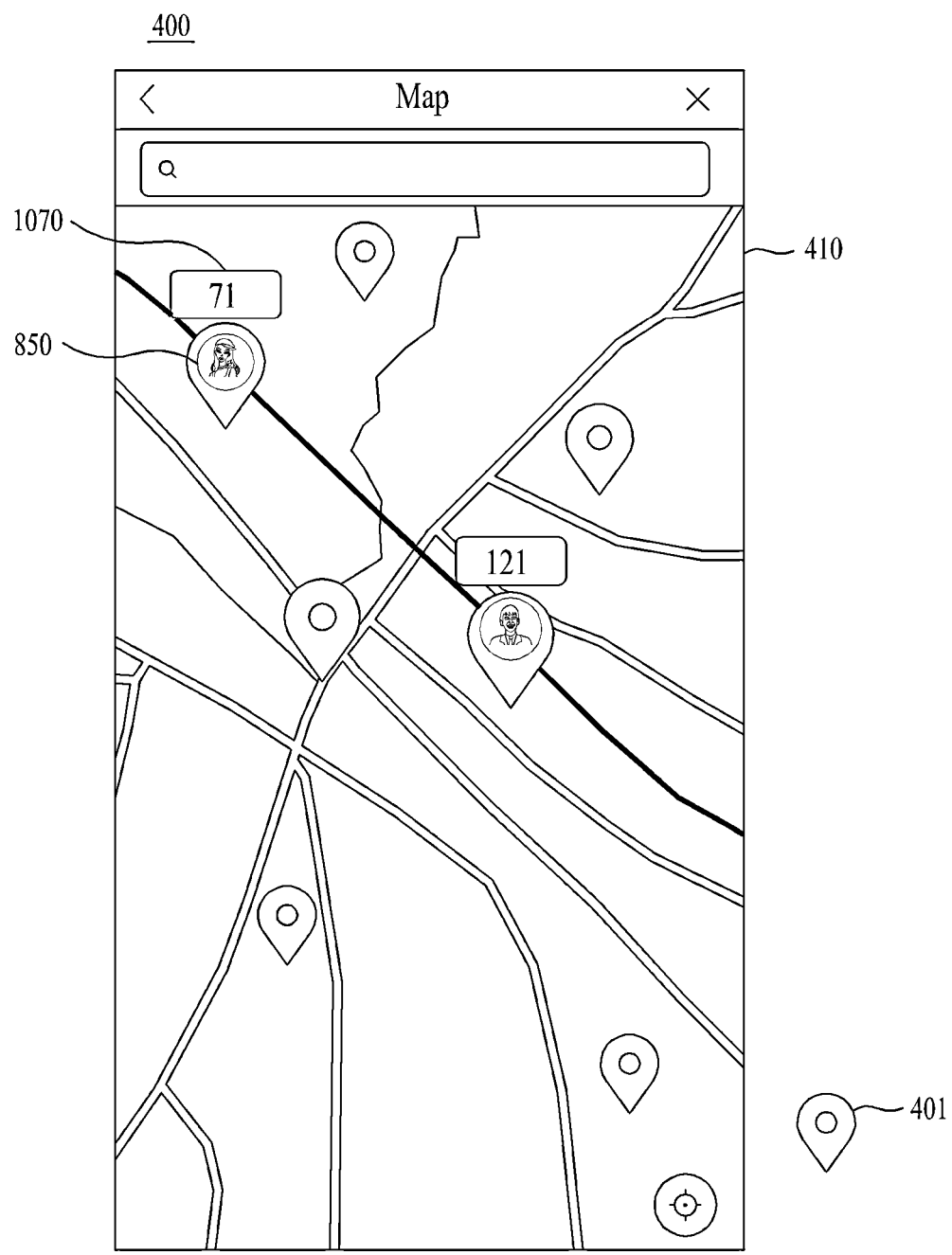

As another example, referring to FIG. 10, the processor 220 may display a message count icon 1070 representing the number of recent messages sent within a predetermined (or alternatively, desired) time range at an upper end of the area pin 401. That is, as message information of a specific area, the processor 220 may collect all the messages sent within the predetermined (or, alternatively, desired) time range with respect to all OpenChat chatrooms present in the corresponding area and may display the number of collected messages as the message count icon 1070.

When a message sending history is present within the time range in an OpenChat chatroom related to an area, the processor 220 may display the profile icon 850 representing the sender profile of the recent message on the corresponding area pin 401.

Here, the processor 220 may distinguishably display a display element (e.g., a size or a color) of the area pin 401 or the message count icon 1070 according to the number of recent messages.

The processor 220 may collect and display message information of an OpenChat chatroom with respect to all areas included in the map screen 410, in addition to displaying message information in the corresponding area pin 401 for each area in which an OpenChat chatroom is present.

Figure 11:
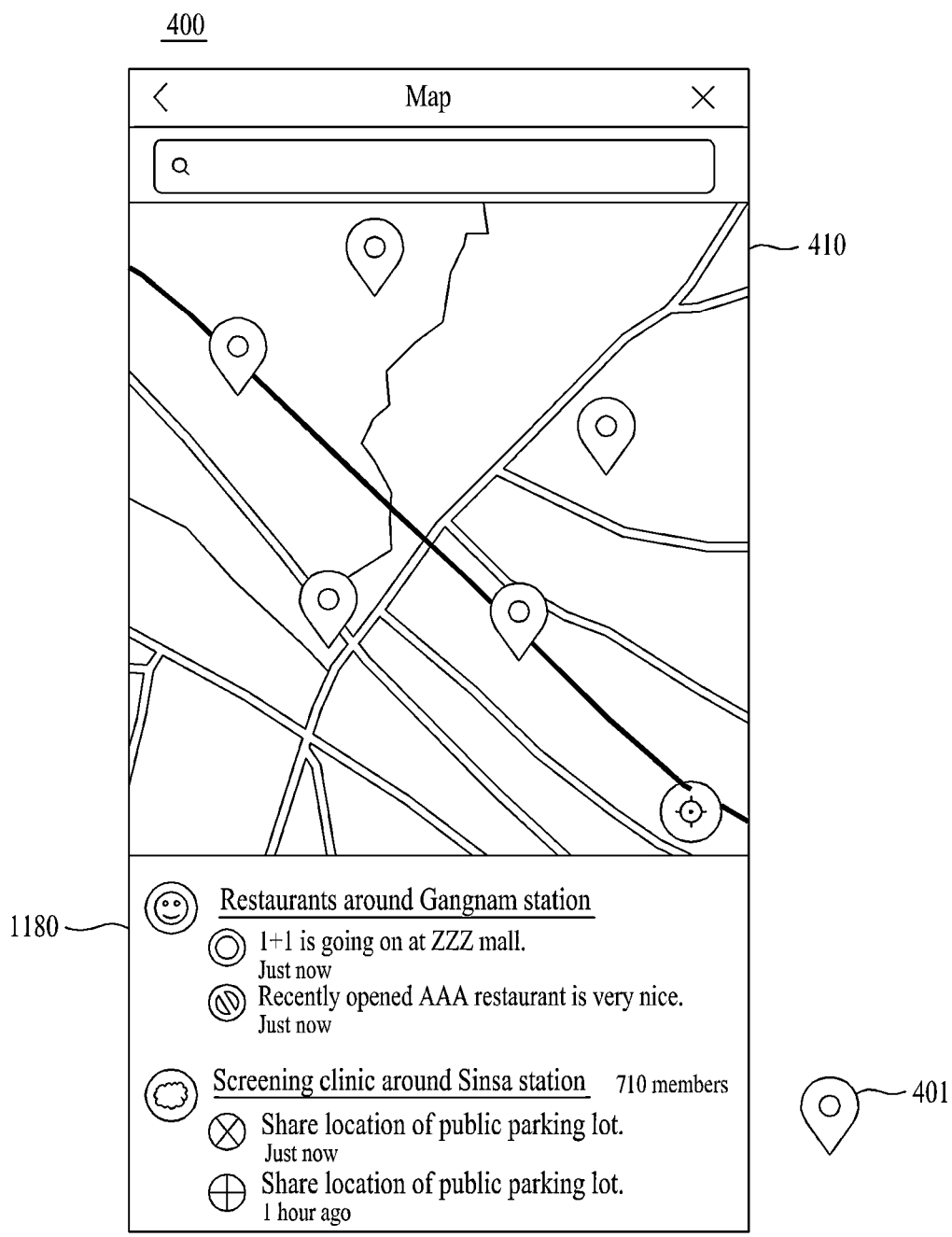

Referring to FIG. 11, the processor 220 may display, on the map screen 410, a list of recent messages 1180 sent within a predetermined (or, alternatively, desired) time range in at least a portion of OpenChat chatrooms included in the entire area of the map displayed on the map screen 410.

For example, with respect to OpenChat chatrooms included in the entire area of the map screen 410, the processor 220 may determine chatroom rankings based on the number of members, the number of messages, a message quantity score, and the like of each corresponding chatroom, and then may configure and display the list of recent messages 1180 sent within the predetermined (or, alternatively, desired) time range in some top ranking chatrooms.

The list of recent messages 1180 may include a certain number of recent messages for each of top-ranking OpenChat chatrooms.

According to another example, the processor 220 may display, on the map screen 410, a list of important messages sent in at least a portion of OpenChat chatrooms of the entire area included in the map displayed on the map screen 410. For example, for example, the processor 220 may determine chatroom rankings based on the number of members, the number of messages, and a message quality score of each of OpenChat chatrooms of the entire area included in the map screen 410 and then may configure and display the list of recent messages 1180 as important messages in some top ranking chatrooms. Here, an important message may be determined based on message information (e.g., information of a chatroom in which a message is sent such as the number of members of the chatroom in which the message is sent, or message information such as correlation between the message and the corresponding area, a sender of the message, a time at which the message is sent, and/or a message length).

A message that satisfies a predetermined (or, alternatively, desired) condition in consideration of a text length or a message type may be selected as an important message as a message highly likely to be a valid message in terms of information in addition to up-to-dateness of a message. For example, a message that includes five or more words, a message that receives a positive reaction, and a message that includes a keyword identical or similar to a topic may be selected as important messages. That is, the processor 220 may determine some chatrooms according to chatroom rankings and then may selectively display messages with high information in order of chatroom popularity.

According to another example embodiment, the processor 220 may determine message rankings based on at least one of information of a chatroom in which a message is sent such as the number of members of the chatroom in which the message is sent and message information such as correlation between the message and a corresponding area, a sender of the message, a time at which the message is sent, a message length, and/or the like, and then may configure and display the list of recent messages 1180. Here, each message may be displayed with information on a chatroom corresponding to each message.

With respect to each message that satisfies a certain condition based on a text length or a message type, the processor 220 may compute information-based score for each message and may display a list of messages in descending order of scores as a message highly likely to be a valid message in terms of information in addition to up-to-dateness of a message.

For example, the processor 220 may display an area in which an OpenChat chatroom is present through the area pin 401 on the map screen 410 of the OpenChat interface screen 400 and, when a message sent within a predetermined (or, alternatively, desired) time range is present in an OpenChat chatroom of an area within the map screen 410, may display corresponding message information on the map screen 410. The processor 220 may provide message information based on a message with high information within an OpenChat chatroom in addition to or other than a recent message.

As described above, information on an area in which an OpenChat chatroom is present, an OpenChat chatroom in which communication is active, and the like may be provided through message information and the area pin 401 displayed on the map screen 410.

Also, information may be provided such that the user may join an OpenChat chatroom of a desired area or an OpenChat chatroom of an area in which communication is active using information displayed on the map screen 410 and thereby acquire or share real-time information.

As described above, according to some example embodiments, it is possible to display, on a map, a chatroom related to an area within the map and to display message information of each chatroom, and/or, to directly display, on the map, at least some of messages sent within a predetermined (or, alternatively, desired) time range in a chatroom.

The apparatuses described above may be implemented using hardware components, software components, and/or a combination thereof. For example, the apparatuses and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular, however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, a computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to some example embodiments may be configured in a form of program instructions performed through various computer methods and recorded in non-transitory computer-readable media. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes, optical media such as CD-ROM and DVDs, magneto-optical media such as floptical disks, and hardware devices (e.g., ROM, RAM or flash memory) that are specially configured to store and perform program instructions. Examples of other media may include recording media and storage media managed by an app store that distributes applications or a site, a server, and the like that supplies and distributes other various types of software.

Any functional blocks shown in the figures and described above may be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, other implementations, other example embodiments, and equivalents are within the scope of the following claims.

What is claimed is:

1. A message information display method executed by a computer device comprising at least one processor configured to execute computer-readable instructions included in a memory, the message information display method comprising:
   accessing a page including a map screen in an environment linked with a map service;
   verifying a chatroom related to each area with respect to areas included in the map screen, based on an area tag of the chatroom, the area tag included as metadata of the chatroom and representing an area set as a subject of the chatroom;
   searching for a specific chatroom associated with a specific area referring to meta information of the chatroom among the areas included in the map screen;
   displaying, by the at least one processor, the specific area through a separate user interface, on the map screen; and
   displaying, by the at least one processor, message information of the specific chatroom, on the map screen through the separate user interface,
   wherein, in response to the map screen being zoomed out or being zoomed in, the separate user interface is displayed on the map screen to include different information,
   wherein the displaying of the specific area comprises
      in response that the map screen is zoomed out beyond a threshold of map scale, displaying a count of a plurality of chatrooms including the specific chatroom in which the specific area is associated with the meta information, in association with the separate user interface,
   wherein the displaying of the message information comprises
      in response to the map screen being zoomed in below or to the threshold of map scale, displaying the message information on the map screen, in association with the separate user interface, and
   wherein the displaying of the specific area comprises
      differently displaying a display element of the separate user interface based on at least one of the count of the chatrooms in which the specific area is associated with the meta information and a number of members of an entirety of the chatrooms.

2. The message information display method of claim 1, wherein the displaying of the specific area further comprises displaying a number of members of an entirety of the chatrooms, with the separate user interface.

3. The message information display method of claim 1, wherein the displaying of the specific area comprises, in response to a selection on at least one specific area, displaying a list of chatrooms in which the selected specific area is associated with the meta information.

4. The message information display method of claim 1, wherein the displaying of the message information of the specific chatroom comprises displaying information on a recent message sent in the chatroom within a desired time range, on the map screen.

5. The message information display method of claim 1, wherein
   the displaying of the specific area comprises displaying the specific area associated with the meta information of the chatroom among areas included in the map screen through the separate user interface, and
   the displaying of the message information of the specific chatroom comprises displaying a message interface that includes information on a recent message sent in the chatroom within a desired time range, at a location adjacent to the separate user interface.

6. The message information display method of claim 5, wherein the displaying of the message information of the specific chatroom comprises displaying an interface representing presence of the recent message or an interface including at least a portion of a body of the recent message or a keyword extracted from the body through the message interface.

7. The message information display method of claim 5, wherein the displaying of the message information of the specific chatroom comprises displaying an interface representing a sender profile of the recent message through the message interface.

8. The message information display method of claim 5, wherein the displaying of the message information of the chatroom comprises displaying information on a message sent from a chatroom selected based on chatroom rankings through the message interface when a plurality of chatrooms is associated with same metadata.

9. The message information display method of claim 5, wherein the displaying of the message information of the specific chatroom comprises differently displaying a display element of the message interface based on a number of recent messages.

10. A non-transitory computer-readable recording medium storing instructions that, when executed by a processor, cause a computer device to implement the message information display method of claim 1.

11. A computer device comprising:
a memory configured to store computer-readable instructions; and
at least one processor configured to execute the computer-readable instructions included in the memory, the at least one processor configured to cause the computer device to,
access a page including a map screen in an environment linked with a map service,
verify a chatroom related to each area with respect to areas included in the map screen, based on an area tag of the chatroom, the area tag included as metadata of the chatroom and representing an area set as a subject of the chatroom,
search for a specific chatroom associated with a specific area referring to meta information of the chatroom among the areas included in the map screen,
display the specific area through a separate user interface, and
display message information of the chatroom that includes the specific area as the meta information, on the map screen through the separate user interface,
wherein, in response to the map screen being zoomed out or being zoomed in, the separate user interface is displayed on the map screen to include different information,
wherein the computer device is configured to display the specific area by, in response that the map screen is zoomed out beyond a threshold of map scale, displaying a count of a plurality of chatrooms including the specific chatroom in which the specific area is associated with the meta information, in association with the separate user interface,
wherein the computer device is configured to display the message information by, in response to the map screen being zoomed in below or to the threshold of map scale, displaying the message information on the map screen, in association with the separate user interface, and
wherein the computer device is configured to display the specific area by differently displaying a display element of the separate user interface based on at least one of the count of the chatrooms in which the specific area is associated with the meta information and a number of members of an entirety of the chatrooms.

12. The computer device of claim 11, wherein the at least one processor is configured to cause the computer device to further display a number of members of an entirety of the chatrooms, with the separate user interface.

13. The computer device of claim 11, wherein the at least one processor is configured to, in response to a selection on at least one specific area, cause the computer device to display a list of the chatrooms in which the selected specific area is associated with the meta information.

14. The computer device of claim 11, wherein the at least one processor is configured to cause the computer device to display an interface representing presence of a recent message or an interface including at least a portion of a body of the recent message or a keyword extracted from the body through a message interface.

15. The computer device of claim 14, wherein the at least one processor is configured to cause the computer device to display an interface representing a sender profile of the recent message through the message interface.

16. The computer device of claim 11, wherein the at least one processor is configured to cause the computer device to display information on a message sent from a chatroom selected based on chatroom rankings through a message interface when a plurality of chatrooms is associated with same metadata.

17. The computer device of claim 11, wherein the at least one processor is configured to cause the computer device to differently display a display element of a message interface based on a number of recent messages.

* * * * *